April 16, 1963   W. O. YALE   3,085,780
PRESSURE OPERATED DIAPHRAGM VALVE
Filed July 20, 1959

INVENTOR.
WAYNE O. YALE
BY
Anderson, Spangler & Wymore
ATTORNEYS

United States Patent Office 3,085,780
Patented Apr. 16, 1963

3,085,780
PRESSURE OPERATED DIAPHRAGM VALVE
Wayne O. Yale, 3162 S. Dale Court, Englewood, Colo.
Filed July 20, 1959, Ser. No. 828,154
8 Claims. (Cl. 251—61)

This invention relates to pilot controlled valves and, more particularly, to a hydro-conversion unit to convert manually controlled valves, such as those commonly in use in lawn sprinkling systems, to a valve adapted to be controlled automatically.

Countless thousands of lawn sprinkling systems have been installed in new and existing lawns across the country. Most generally, these systems have been installed using manually operated valves for controlling various sections of the system. It is the usual practice to connect the various sections of the system to a main supply line through a manifold with a globe valve positioned between the manifold and a feeder line to each section.

Where it is desired to convert these existing manually controlled systems to an automatically or semi-automatically controlled system, the manual valves normally have to be replaced. This is expensive and the original investment in valves is lost. Where a new system is installed, presently available pilot controlled valves are costly and suffer from several disadvantages because of their complexity and because of the difficulties in draining and preparing the system for freezing weather after the season's use.

It is an important object of the present invention, therefore, to provide an improved pilot controlled valve which avoids one or more of the disadvantages of the prior-art arrangements, one which permits ready draining of a system and one which will withstand freezing temperatures without damage thereto.

Another important object of this invention is to provide a conversion unit for use in converting a manually controlled valve to a valve of the pilot controlled type which will permit ready draining of a system and will withstand freezing temperatures without damage thereto.

In accordance with the invention, the improved hydro-conversion unit comprises in combination with a valve body having an inlet, an outlet and a passage therebetween including a valve seat, a bonnet depending from the valve body including motor means and valve means operatively connected to the motor means and positioned to engage the valve seat and close the passage on actuation of the motor means.

For a better understanding of the present invention, together with other and further objects thereof, reference is had to the following description taken in connection with the accompanying drawing and its scope will be pointed out in the appended claims.

Figures 1, 3:
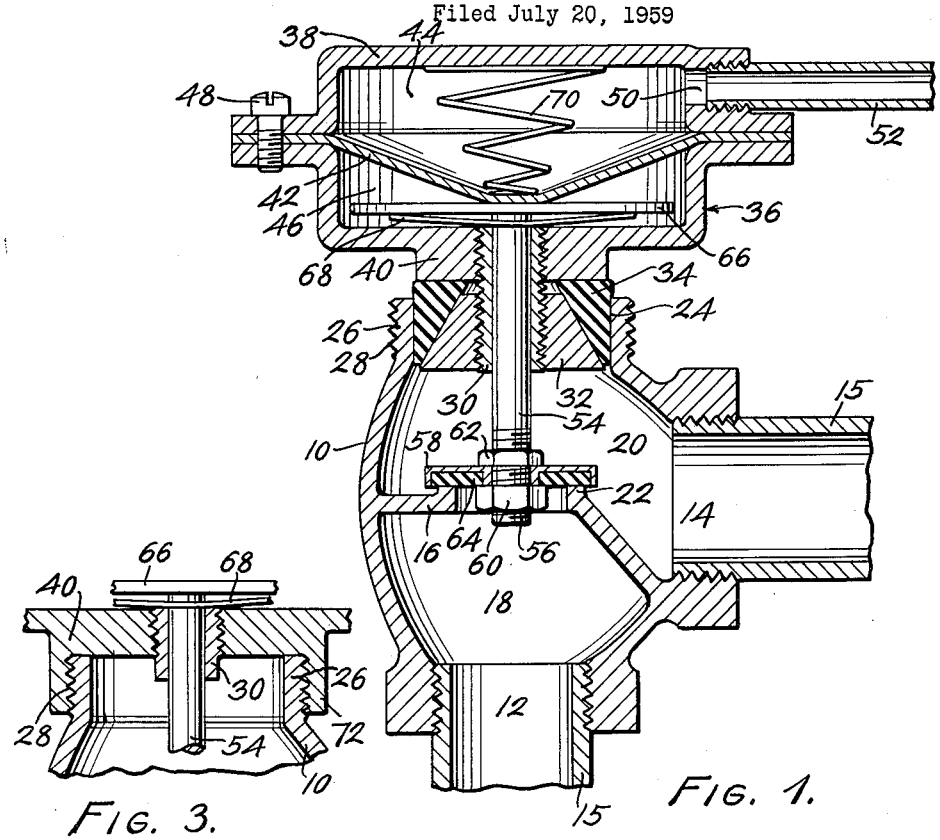
FIGURE 1 is an elevational view in section of a valve in accordance with the present invention showing the valve closed.
Figure 2:
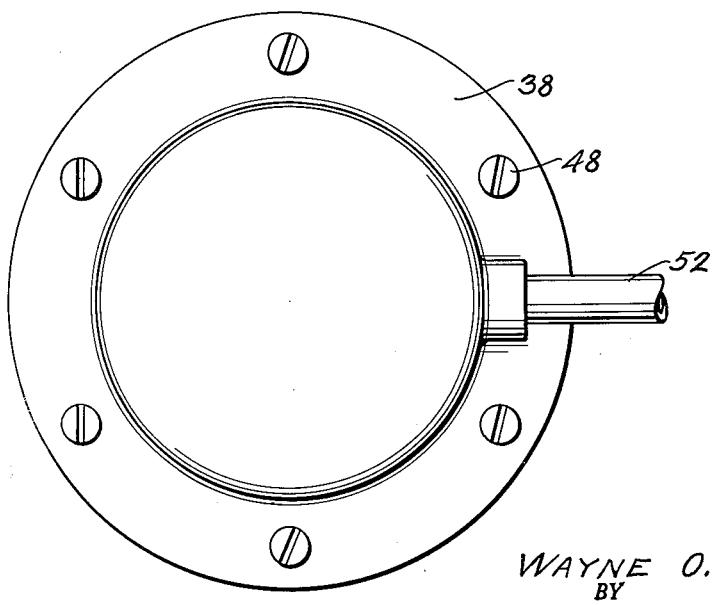
FIGURE 2 is a plan view of the conversion control unit shown in section in FIGURE 1; and, FIGURE 3 shows one manner of connecting a control unit of this invention as an integral part of original equipment.

Referring to FIGURE 1 of the drawing, numeral 10 designates a valve casing or housing of any suitable ferrous or non-ferrous alloy having an inlet 12 and an outlet 14 provided with internal threads whereby the valve body may be connected to a flow line 15. The valve body is formed with the partition 16, which divides the valve body into an inlet chamber 18 and an outlet chamber 20. The central horizontal section of the partition is apertured and provided with an annular lip forming a valve seat 22. Communication between the inlet and outlet chambers is thus established by the passage or port defined by valve seat 22.

The upper portion of the valve body 10 is provided with an opening 24 axially aligned with the aperture defined by valve seat 22, extending upwardly into a neck portion 26 which may be provided with threads 28.

A valve bonnet, as shown in FIGURE 1, is comprised of a close nipple 30, a truncated cone 32 threaded onto nipple 30 and a resilient ring 34 whose inner surface mates with the outer surface of cone 32. A motor generally indicated by numeral 36 is threadedly attached to the upper part of nipple 30. The motor 36 illustrated is seen to comprise a lower housing 40 and an upper housing 38. A flexible diaphragm 42 is positioned between the upper and lower housings and serves to define a chamber 44 and 46 respectively on either side thereof. The upper and lower housings are clamped together on the edges of diaphragm 42 to provide a fluid-tight seal between chambers 44 and 46 by suitable means, such as by studs 48 and the like. Upper motor housing 38 is provided with an opening 50 to which a control line 52 may be connected by suitable means to communicate with upper chamber 44 of motor 36.

A valve stem 54 is positioned in slip fit relation within coupling 30 and provided at the lower end with threads 56. Valve closure member 58 is secured to valve stem 54 on threads 56 between nuts 60 and 62. Closure member 58 is provided with an annular ring 64 of resilient material attached to the lower surface thereof and adapted to mate with lip of valve seat 22 to effect a fluid tight seal. The upper end of valve stem 54 is attached to a disc 66 of suitable material. Spring means 68 is positioned between disc 66 and lower housing 40 to provide an upward bias on the valve stem 54 when the resilient material 64 of valve closure 58 is in sealing relation with valve seat 22. A spring 70 is positioned in chamber 44 between the top of upper housing 38 and the central portion of diaphragm 42 providing a smaller continuous bias on the upper surface of the diaphragm to assist in the closing of the valve.

As best seen in FIGURE 3, the bonnet, motor, valve stem and valve may be secured to the valve body by means of an annular flange 72 depending from lower body portion 40 and having internal threads adapted to mate with threads 28 of the valve body. The embodiment of FIGURE 3 may be installed as original equipment.

In use, the inlet pipe 15 is connected to a source of water under pressure. Control line 52 is also connected to a source of water under pressure with intermediate control valve means (not shown) to connect and disconnect control line 52 and upper chamber 44 from the source. The control valve means may be actuated by a clock mechanism adapted to disconnect chamber 44 from the source of pressure at intervals and for predetermined periods of time. When pressure is exerted in chamber 44, diaphragm 42 is deflected downwardly, moving attached valve stem 54 and valve closure member 58 into contact with valve seat 22, interrupting flow from inlet 12, chamber 18 to chamber 20, and outlet 14 of the valve. Just prior to closing, disc 66 engages spring 68, compressing same, which provides a relatively powerful upward bias on the disc and attached valve stem and closure member operative over a relatively short distance.

The spring 68 and its function is an important aspect of the present invention in providing the force necessary for initial break-away of valve closure 58 and resilient material 64 from valve seat 22. Further, it has been found that where the valve has been subjected to adverse freezing conditions, the force exerted by spring 68 is sufficient, on disconnecting chamber 44 and inlet 12 from a source of pressure, to crack the valve closure 58 sufficient to permit the downstream line connected to outlet 14 to be drained and prevent damage from freezing.

When used as a conversion unit to convert manually operated valves to automatic operation, the original bonnet, valve stem, valve and hand wheel are removed. The conversion unit of this invention is inserted into the opening at the top of the valve with the resilient ring 34 engaging the inner surface of the opening. The motor 36 is rotated, rotating coupling 30, which draws cone 32 upwardly forcing ring 34 into fluid-tight contact with the opening. Valve closure member 58 may be adjustably positioned on valve stem 54 by means of threads 56 and nuts 60 and 52. The sizes of valve closure 58 and ring 32 may be varied to accommodate a particular valve.

While there have been described what at present are considered to be the preferred embodiments of this invention, it will be obvious to those skilled in the art that various changes and modifications may be made therein without departing from the invention. It is aimed, therefore, in the appended claims to cover all such changes and modifications which fall within the true spirit and scope of the invention.

What is claimed is:

1. A pressure operated valve comprising: a valve body having a plurality of openings therein, a bonnet member seated in one of the said valve body openings, an actuator comprising an upper and lower body portion, a flexible diaphragm dividing the actuator body into an upper and a lower chamber, a valve stem extending through said bonnet with the upper end terminating within the lower chamber of said actuator adjacent the flexible diaphragm, an opening in the upper body portion of the actuator to admit a fluid under pressure, said bonnet member including a rigid member in the shape of a truncated cone, means operably connecting the rigid member to the lower body portion of the actuator, and a resilient seal having inclined inner surfaces mated in complementary relationship with the truncated surface of said rigid member positioned between the valve body and the said rigid member.

2. A pressure operated valve as set forth in claim 1 including spring means adapted to bias said valve stem upwardly toward said diaphragm when the upper chamber is connected to a source of fluid under pressure.

3. A pressure operated valve according to claim 2, wherein the valve stem is provided with plate means attached to the upper end thereof substantially normal to the axis of the valve stem and said spring means is positioned intermediate said plate means and the bottom of the lower chamber.

4. A conversion unit for converting a manual operated valve having a valve body to a pressure operated valve comprising: actuator means having upper and lower body portions forming a cavity therebetween, flexible diaphragm means dividing said cavity into upper and lower chambers, an opening in the upper body portion adapted to be connected to a source of fluid under pressure, an opening in the lower body portion, a valve stem extending through said opening into said lower chamber in proximity to the diaphragm, spring means adapted to bias said valve stem toward said diaphragm and means for attaching the conversion unit to the valve body including a movable rigid member in the shape of a truncated cone, means interconnecting the lower body portion of the conversion unit and the rigid member and adapted to establish relative movement therebetween, and a resilient sealing ring having inclined inner surfaces mated in complementary relationship with the truncated surface of said rigid member positioned between the rigid member and the said lower body portion.

5. A conversion unit according to claim 4 wherein the valve stem includes plate means attached to the upper end within the lower chamber substantially normal to the axis of said stem and the spring means is positioned intermediate said plate means and the bottom of said lower chamber.

6. The conversion unit of claim 5 wherein the spring is of a type and positioned to provide a relatively powerful bias on said valve stem operative over a relatively short distance.

7. A pressure operated valve as set forth in claim 1 wherein the bonnet member includes a threaded nipple, a nut in the shape of a truncated cone threadedly attached to the nipple, and an annular ring of resilient material having inclined inner surfaces, said ring contiguously mated in a complementary relationship with the truncated surface of said nut adapted to be received within the said one opening of the valve body, the top surface of said ring engaging the bottom surface of the lower body portion of the actuator.

8. A conversion unit according to claim 4 wherein the bonnet means includes a threaded nipple depending from the opening in the lower body portion and disposed concentrically with the valve stem, a frusto-conical nut threadedly mounted on said nipple, and an annular resilient sealing ring having an inner surface which is complementary to the frusto-conical surface of said nut, said ring contiguously mated to the nut in abutting relationship and concentric with the valve stem.

References Cited in the file of this patent
UNITED STATES PATENTS

| | | |
|---|---|---|
| 221,874 | Sponsler | Nov. 18, 1879 |
| 1,178,145 | Florence | Apr. 4, 1916 |
| 2,374,947 | Nicholson | May 1, 1945 |
| 2,615,468 | Woolley | Oct. 28, 1952 |
| 2,736,337 | Parks | Feb. 28, 1956 |
| 2,744,775 | Bredtschneider | May 8, 1956 |
| 2,757,752 | Kaufman | Aug. 7, 1956 |